(12) United States Patent
Summer et al.

(10) Patent No.: US 10,513,412 B2
(45) Date of Patent: Dec. 24, 2019

(54) AUTOMATIC SPOOL TENSIONING MECHANISM

(71) Applicant: HARRIS CORPORATION, Melbourne, FL (US)

(72) Inventors: Matthew D. Summer, Melbourne, FL (US); Paul M. Bosscher, West Melbourne, FL (US); Michael E. Bowman, Satellite Beach, FL (US); William S. Bowman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 282 days.

(21) Appl. No.: 15/668,424

(22) Filed: Aug. 3, 2017

(65) Prior Publication Data
US 2019/0039856 A1 Feb. 7, 2019

(51) Int. Cl.
*F41H 11/16* (2011.01)
*B65H 75/44* (2006.01)
(Continued)

(52) U.S. Cl.
CPC .......... *B65H 75/4444* (2013.01); *B25J 5/005* (2013.01); *B25J 9/046* (2013.01);
(Continued)

(58) Field of Classification Search
CPC .............. B65H 75/425; B65H 75/4444; B65H 75/4484; B65H 75/4486; B25J 9/046;
(Continued)

(56) References Cited

U.S. PATENT DOCUMENTS

| 3,899,143 A | 8/1975 | Slezak |
| 5,647,554 A | 7/1997 | Ikegami et al. |

(Continued)

FOREIGN PATENT DOCUMENTS

| CH | 622 225 A5 | 3/1981 |
| DE | 10 2012 024595 A1 | 6/2014 |

OTHER PUBLICATIONS

Extended European Search Report dated Jan. 7, 2019 for European Patent Application No. 18185663.4.
(Continued)

*Primary Examiner* — Sang K Kim
(74) *Attorney, Agent, or Firm* — Fox Rothschild LLP; Carol E. Thorstad-Fosyth; Robert J. Sacco

(57) ABSTRACT

Systems (100) and methods (1400) for operating a Spool Mechanism ("SM"). The methods comprise: transitioning an operational mode of SM from a first operational mode in which a drag torque is not settable to a second operational mode in which the drag torque is settable; selectively mechanically coupling a rewind motor to a spool (612) of SM by engaging a coupler (1014) in response to the SM's transition into the second operational mode; activating the rewind motor (610) such that the rewind motor applies a motor torque having a pre-defined value selected for facilitating a setting of the drag torque to an optimal value; mechanically gradually adjusting an amount of drag resistance applied to the spool by a drag mechanism (1012); and discontinuing the mechanical adjustment of the drag resistance when the spool's speed is within a threshold percentage range of a zero resistance speed.

20 Claims, 13 Drawing Sheets

(51) Int. Cl.
*B65H 75/42* (2006.01)
*B25J 11/00* (2006.01)
*B25J 5/00* (2006.01)
*B25J 9/04* (2006.01)
*B25J 13/06* (2006.01)

(52) U.S. Cl.
CPC ......... *B25J 11/0025* (2013.01); *B25J 13/065* (2013.01); *B65H 75/425* (2013.01); *B65H 75/4484* (2013.01); *B65H 75/4486* (2013.01); *F41H 11/16* (2013.01); *B65H 2701/32* (2013.01)

(58) Field of Classification Search
CPC ...... B25J 5/005; B25J 13/065; B25J 11/0025; F41H 11/16
See application file for complete search history.

(56) References Cited

U.S. PATENT DOCUMENTS

| | | |
|---|---|---|
| 6,113,343 A | 9/2000 | Goldenberg et al. |
| 7,331,436 B1* | 2/2008 | Pack .................... B65H 75/425 |
| | | 191/12.2 A |
| 7,546,912 B1 | 6/2009 | Pack et al. |
| 9,169,103 B1 | 10/2015 | Jenkins et al. |
| 2006/0071116 A1* | 4/2006 | Quenneville ........ B65H 75/425 |
| | | 242/557 |
| 2014/0222276 A1* | 8/2014 | Bosscher ............... G05D 1/021 |
| | | 701/23 |

OTHER PUBLICATIONS

Yang, X., et al., "Experimental Comparison of Robotics Locomotion with Passive Tether and Active Tether," 2009 IEEE International Workshop on Safety, Security & Rescue Robotics, pp. 1-6.
Perrin, D.P., et al., "A Novel Actuated Tether Design for Rescue Robots Using Hydraulic Transients," Proceedings of ICRA 2004, vol. 4, pp. 3482-3487.

* cited by examiner

AUTOMATIC SPOOL TENSIONING MECHANISM

FIELD

This document relates generally to spool tensioning mechanisms. More particularly, this document relates to spool tensioning mechanisms that will automatically achieve optimal drag.

BACKGROUND

UGVs are motorized vehicles that operate without an on-board human presence. Remotely-controlled and remotely-guided unmanned vehicles (such as UGVs) are in widespread use in applications such as Explosive Ordinance Disposal ("EOD"), search and rescue operations, hazardous material disposal, surveillance, etc. A typical UGV includes a chassis, wheels, drive motors mounted on the chassis, an articulating arm mounted on top of the chassis, grippers and a camera mounted on the arm. UGVs can also be equipped with steerable front wheels to facilitate directional control. Alternatively, UGVs can include tracks that facilitate operation over rough terrain. Steering of tracked UGVs can be effectuated by simultaneously operating the wheels or tracks on opposite sides of the UGV.

Movement and steering of an UGV can be controlled by a user from a location remote from the UGV using a joystick-equipped control unit. The control unit communicates with the UGV by way of a wireless communication link or a tether communication link. The control unit may also be used to remotely control the UGV's robotic arm, gripper, and camera. Movement of the UGV is typically controlled by modulating the velocity of the UGV in proportion to the displacement of the joystick of the control unit.

The tether communication link is used when Radio Frequency ("RF") communication is not possible or not preferred. For example, the tether communication link is used when the UGV is operating in an RF-denied environment (e.g., jamming), in a difficult RF environment (e.g., underground tunnels), or in a scenario in which it is desirable to minimize RF signature (e.g., to avoid detection).

The tether communication link is typically implemented via a Fiber-Optic ("F/O") cable. The tether media is paid out from a spool. Spool pay-out is controlled. Re-usable tether media is re-wound onto the spool after use. This type of spooling mechanism requires the use of a spool drag device to control tether tension during pay-out. It is extremely difficult to achieve consistent drag (due to effects of temperature, humidity, dust, etc.). Incorrect drag performance can foul the spool, compromising the mission.

There are two types of tether spools, namely a single use tether spool and a multi-use tether spool. The single use tether spool has a simple design with no drag mechanism. However, the single use tether spool is not reusable, and therefore is an expensive solution. The multi-use tether spool is reusable, and therefore has a lower lifetime cost as compared to the single user tether spool. However, the multi-use tether spool is more complex (e.g., it may require a level-wind mechanism) and experiences spool fouling if drag is not applied correctly.

SUMMARY

The present disclosure concerns implementing systems and methods for operating a spool mechanism. The methods comprise: paying out a certain amount of tether from the spool while a coupler (e.g., a clutch) is disengaged; transitioning an operational mode of the spool mechanism from a first operational mode of a plurality of different operational modes in which a drag torque is not settable to a second operational mode of the plurality of different operational modes in which the drag torque is settable; selectively mechanically coupling a rewind motor to a spool of the spool mechanism by engaging a coupler (e.g., a clutch) in response to the spool mechanism's transition into the second operational mode; activating the rewind motor such that the rewind motor applies a motor torque having a pre-defined value selected for facilitating a setting of the drag torque to an optimal value; mechanically gradually adjusting an amount of drag resistance applied to the spool by a drag mechanism; discontinuing the mechanical adjustment of the drag resistance when the spool's speed is within a threshold percentage range of a zero resistance speed; and/or discontinuing a supply of power to the rewind motor when the spool's speed is within the threshold percentage range of the zero resistance speed.

In some scenarios, the operational mode of the spool mechanism is changed via user interaction with an input device of the spool mechanism. In those or other scenarios, the motor torque is proportional to a desired drag torque generated in the spool mechanism as a result of contact between the drag mechanism and an element mechanically coupled to the spool's rotation (e.g., mechanically coupled to one of the spool's retaining plates). The motor torque may act to rewind the tether onto the spool.

The drag mechanism can comprise an adjustable spring loaded support arm having a brake pad coupled thereto for providing the drag resistance through sliding friction against a rotating element of the spool mechanism. The amount of drag resistance is adjusted by rotating the brake pad towards or away from the spool. The amount of drag resistance may be manually adjusted using a tool.

DETAILED DESCRIPTION OF THE DRAWINGS

Embodiments will be described with reference to the following drawing figures, in which like numerals represent like items throughout the figures, and in which.

Figure 6:
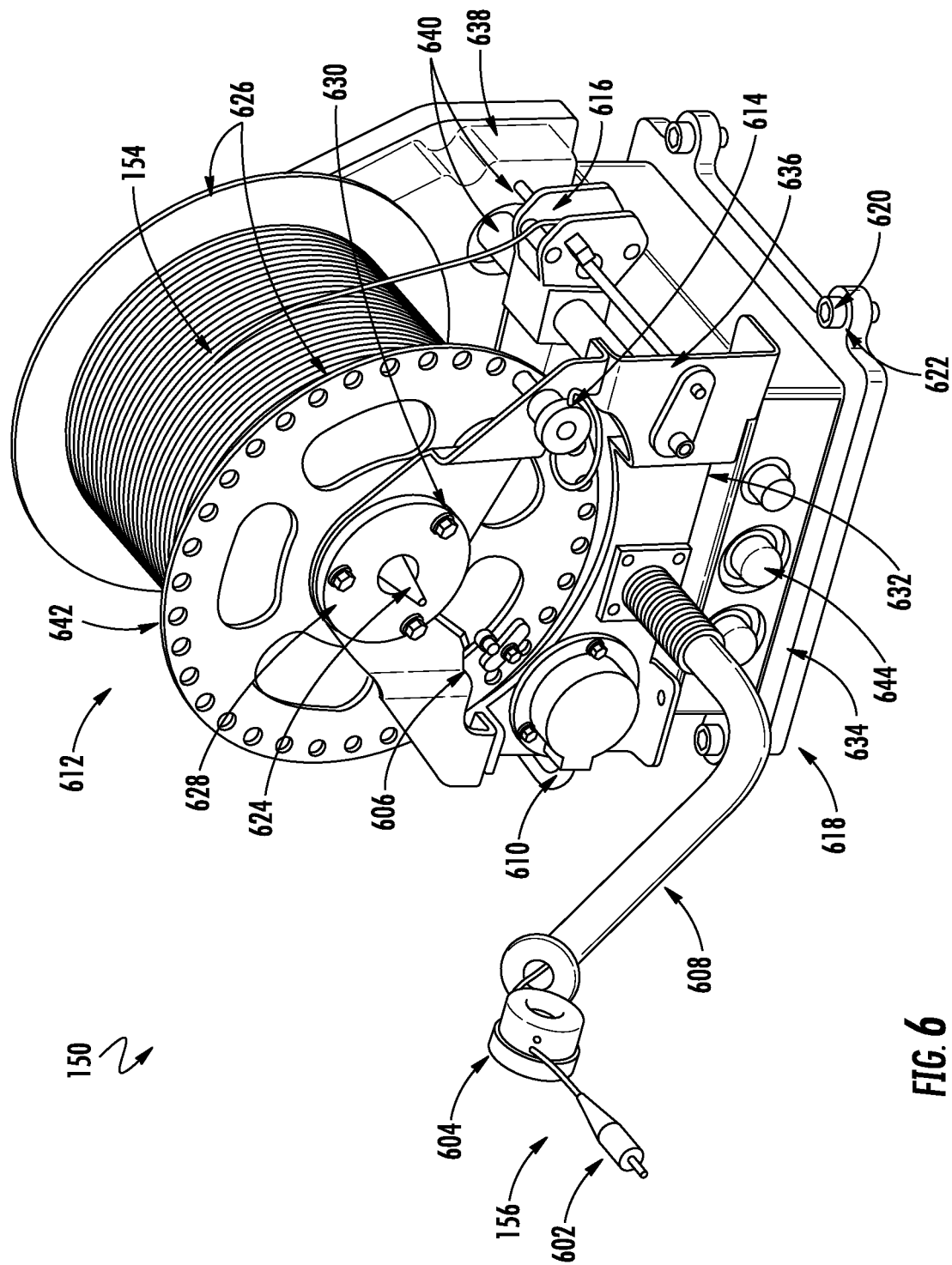
Figure 7:
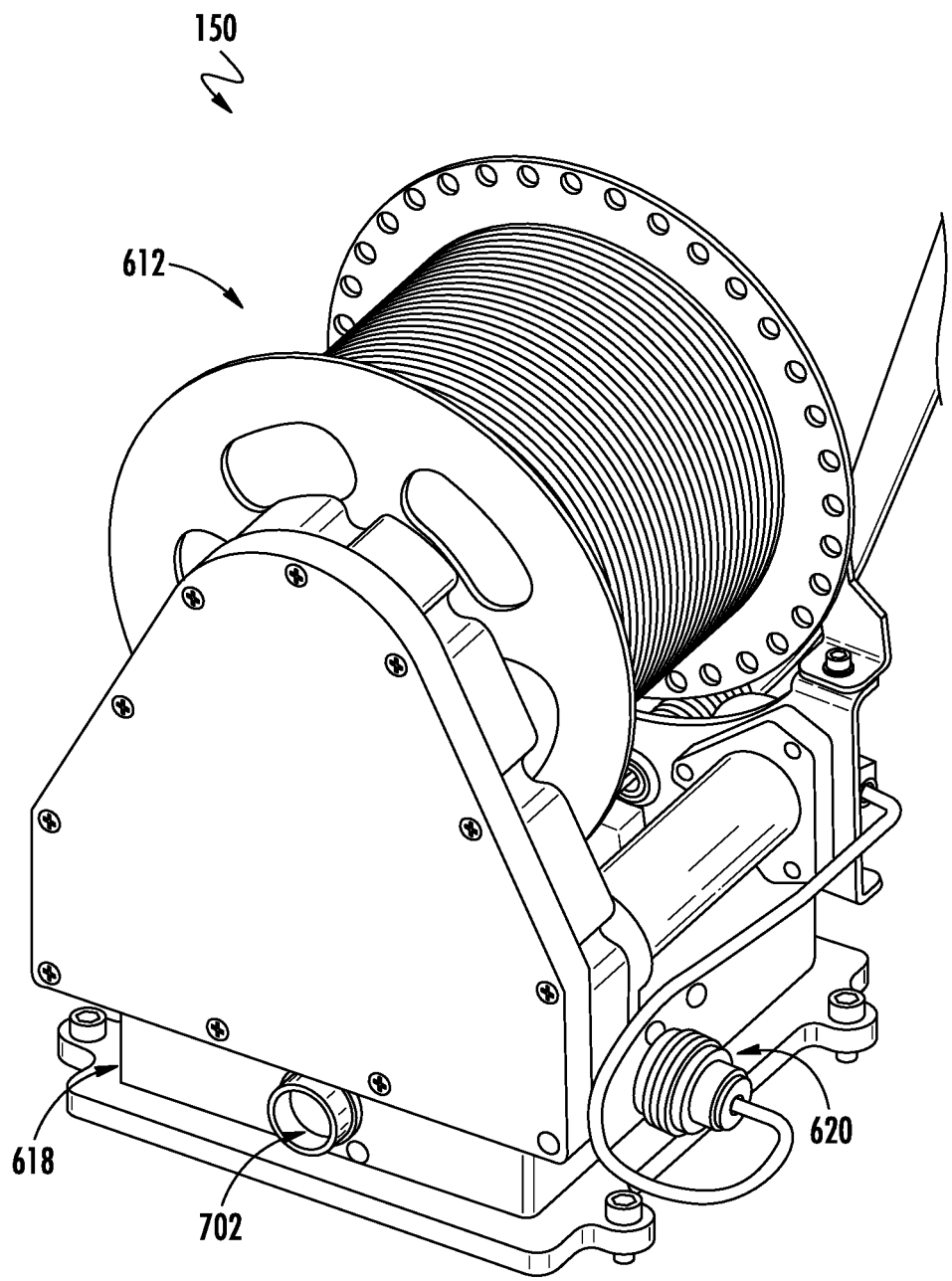
Figure 8:
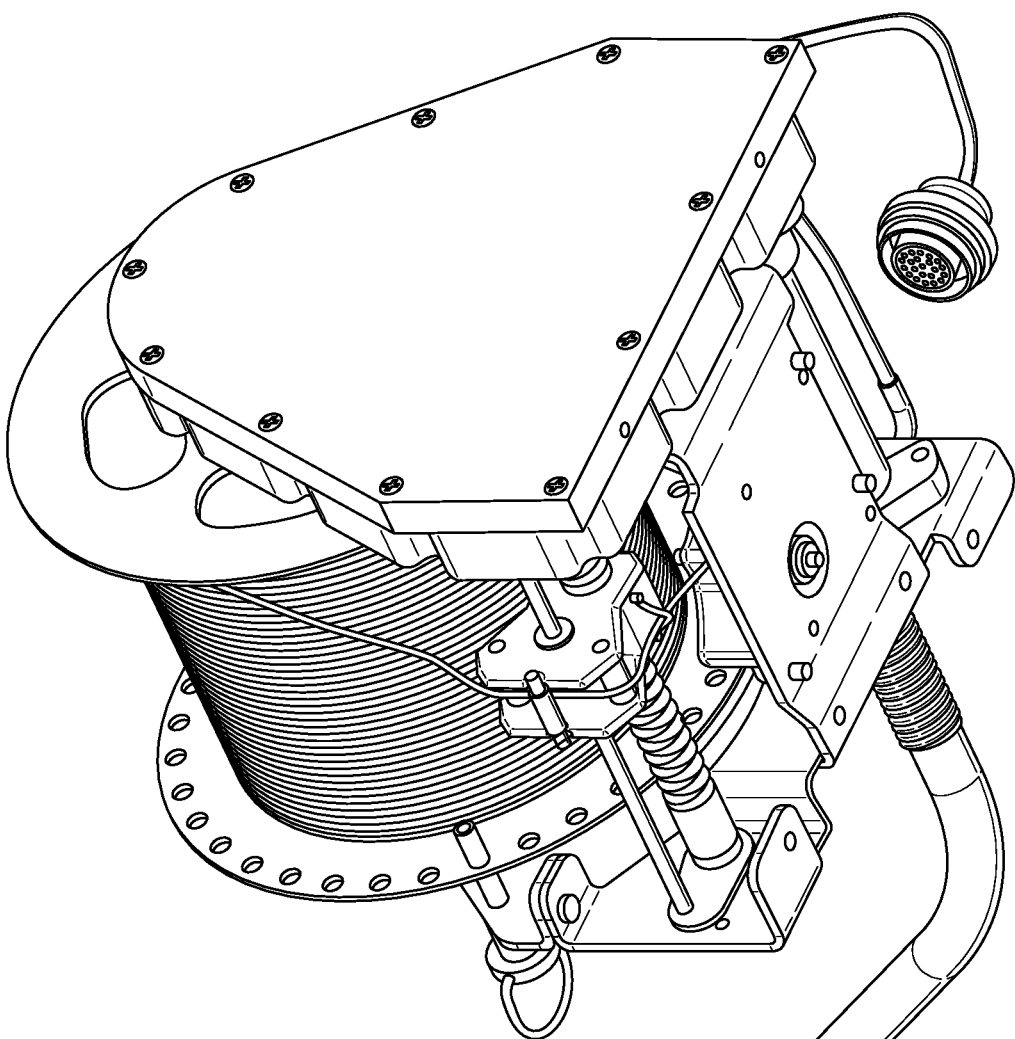
Figure 8:
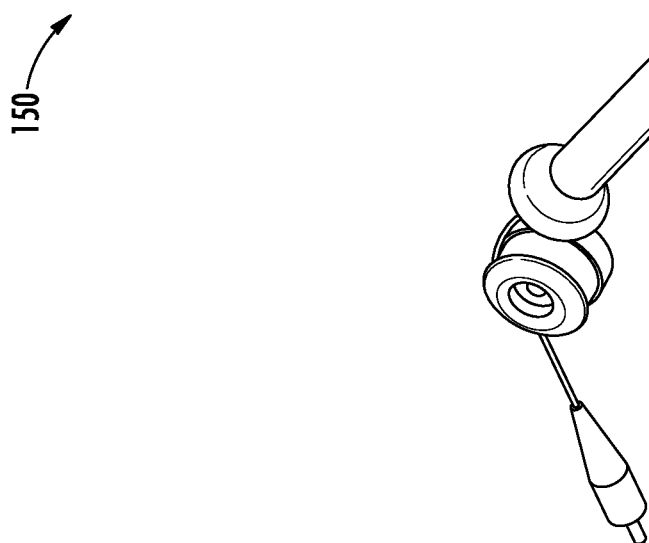

FIGS. 6-8 each provide a perspective view of an illustrative spool mechanism.

Figure 9:
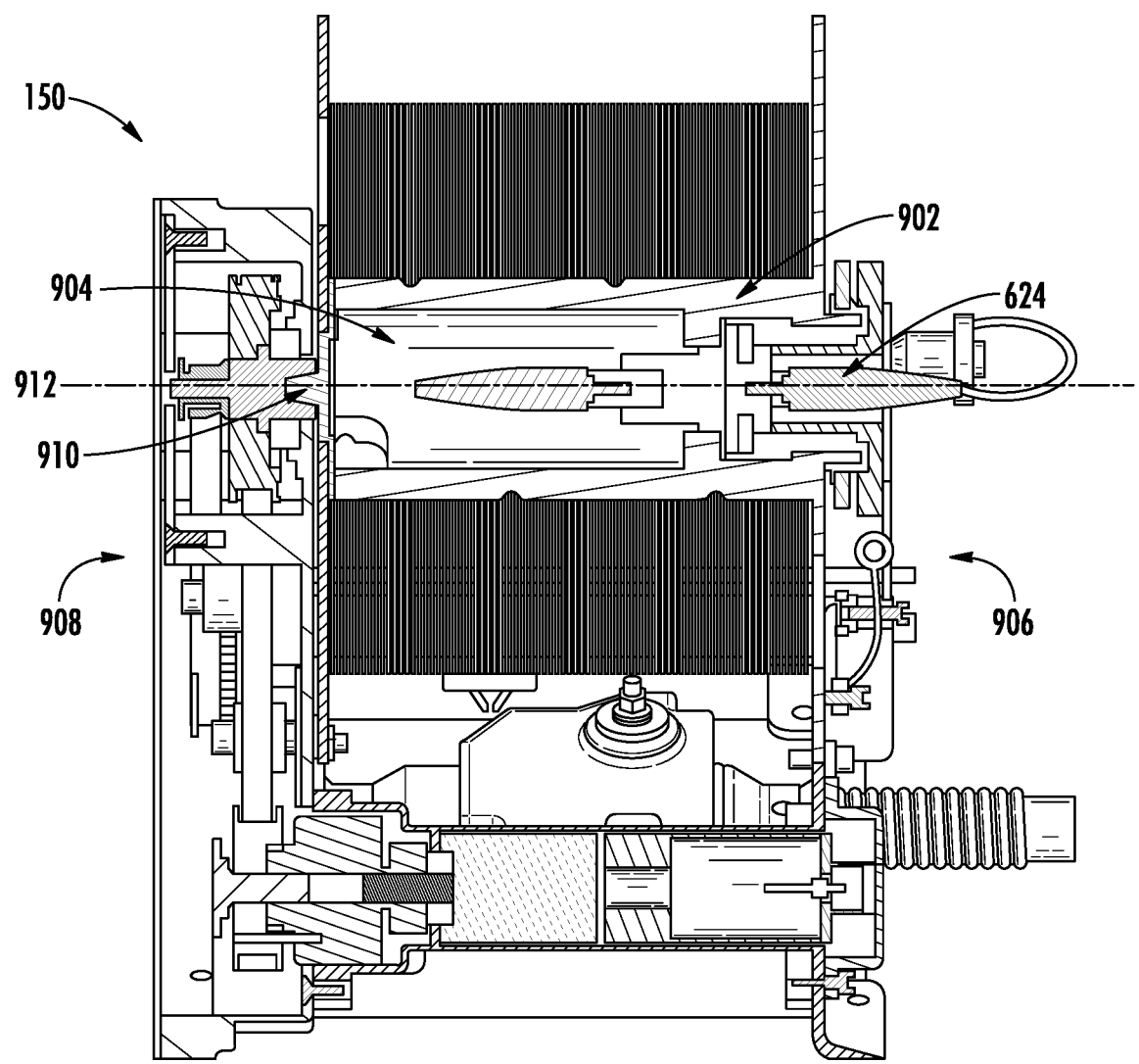

FIG. 9 is a cross-sectional view of the spool mechanism shown in FIGS. 6-8.

Figure 10:
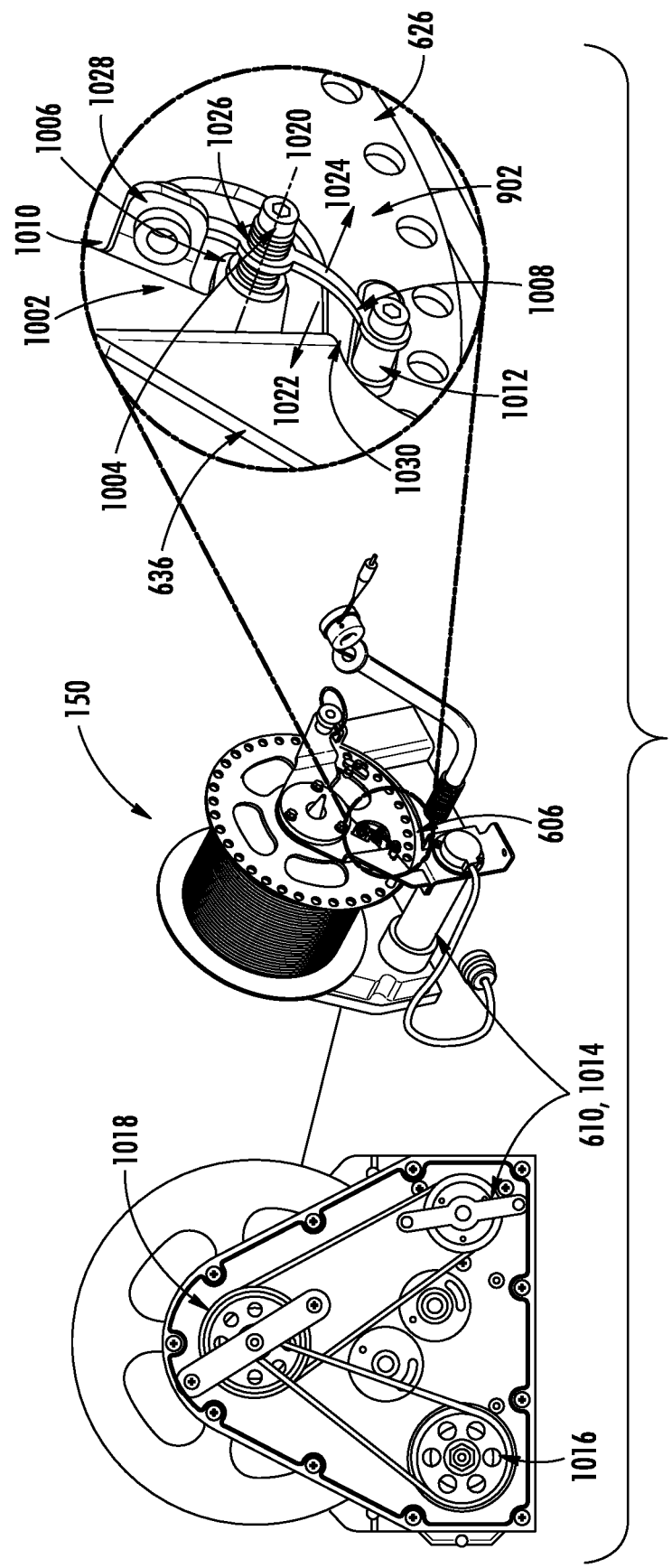

FIG. 10 is an illustration that that shows various components of the spool mechanism shown in FIGS. 6-9 is more detail.

Figure 11:
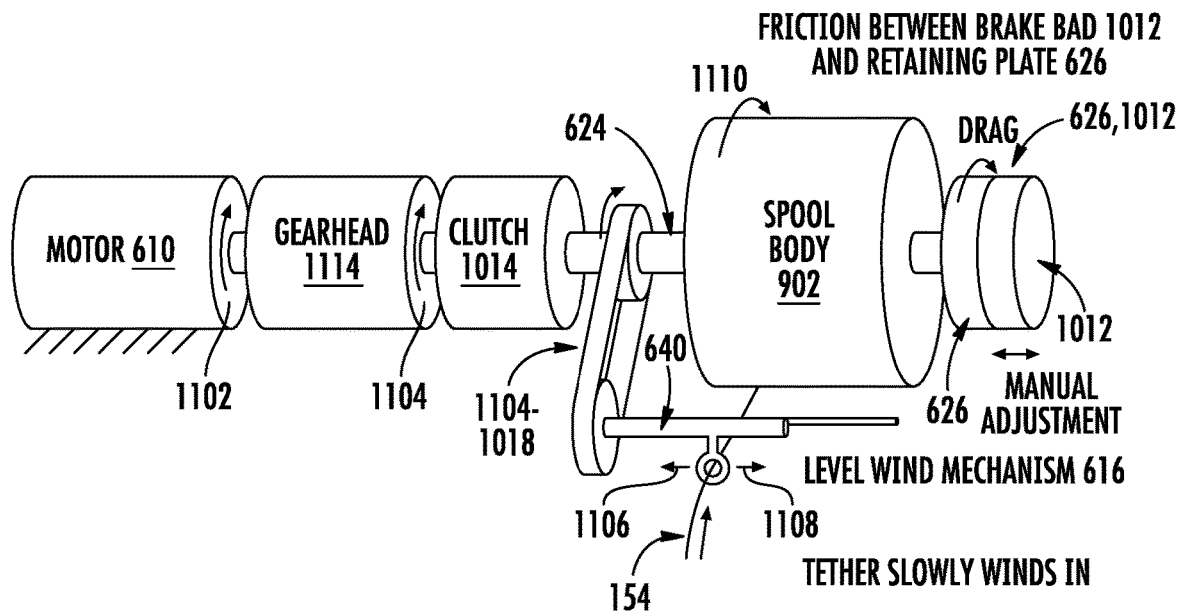
Figure 12:
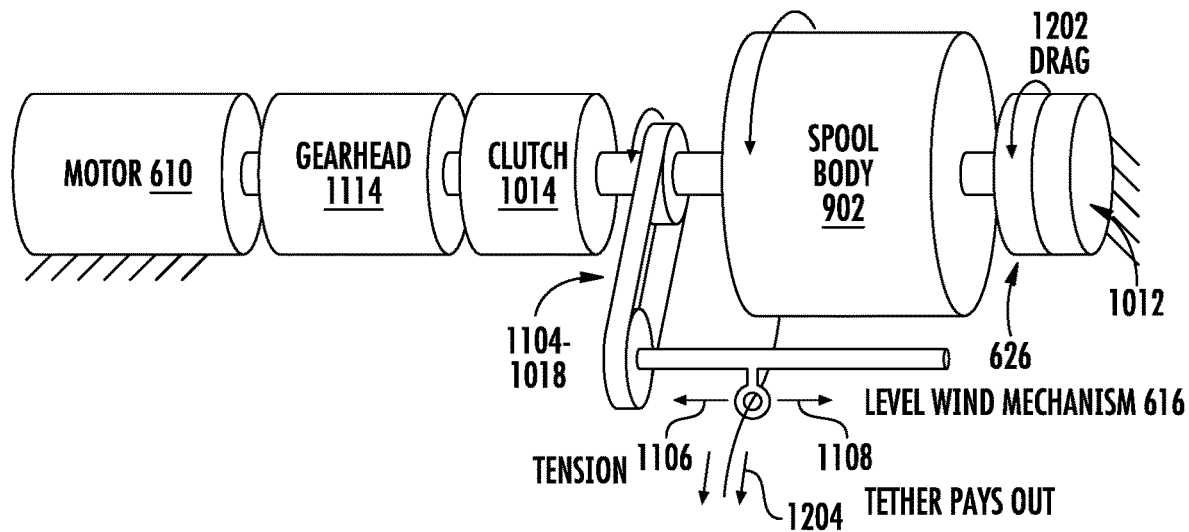
Figure 13:
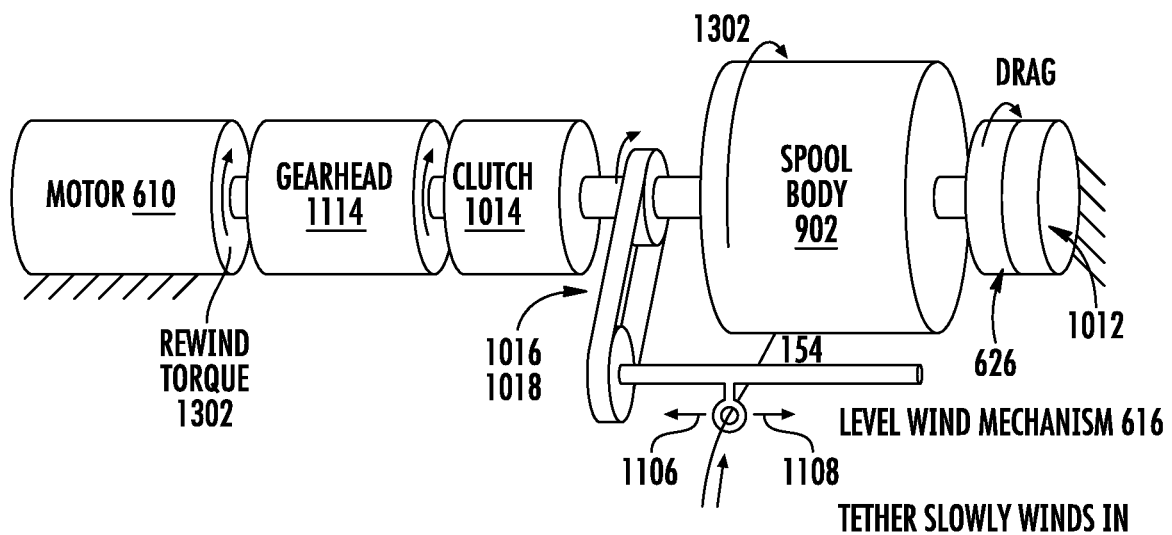

FIGS. 11-13 provide illustrations that are useful in understanding the operation of the spool mechanism shown in FIGS. 6-10.

Figure 14:
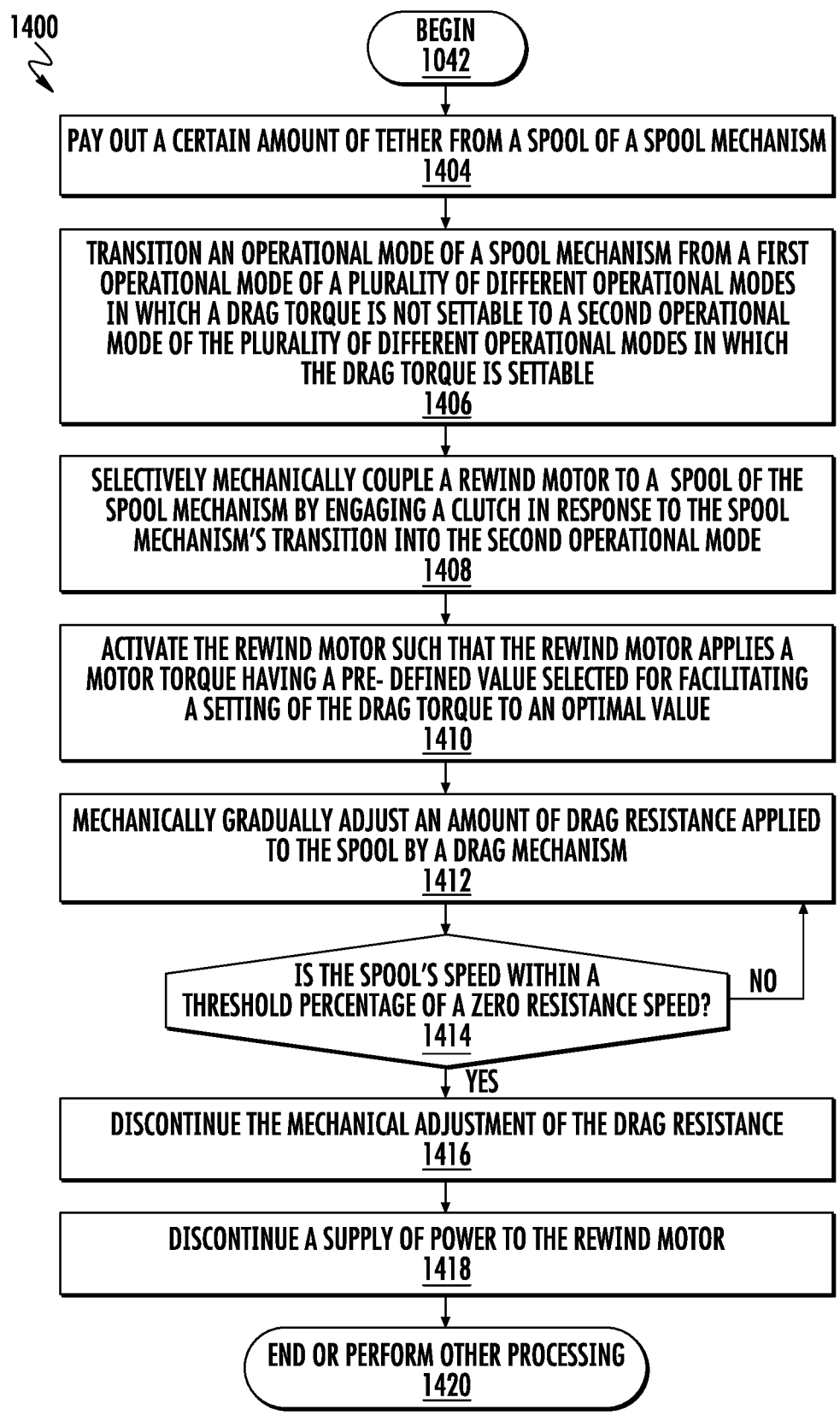

FIG. 14 is a flow diagram of an illustrative method for operating a spool mechanism.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for providing an automatic spool tensioning mechanism. The automatic spool tensioning mechanism is designed to automatically achieve optimal drag. The automatic spool tensioning mechanism can be used in a variety of applications, such as UGV applications or other vehicle applications. In the UGV applications, it is desirable to maintain tension in the tether at all times while the tether is being paid-out. If loops of tether around the spool loosen, then the tether loops can overlap and jam the spool. This jamming is called tether fouling.

In conventional systems, the drag is provided via friction on the spool. The spool can overshoot if there is too little friction, which results in fouling of the tether. The tether media can break if there is too much friction. Additionally, the UGV's course of travel can be undesirably and unintentionally altered when there is too much friction.

The most common reusable tether spool with a drag mechanism is a fishing spool. Drag is set by hand each time the fishing rod is used (by feel via manual rotation of a handle). The fishing spool design suffers from certain drawbacks when contemplated for use in a UGV application. For example, the drag on a vehicle-mounted spool needs to be set accurately. This cannot be done by feel (especially when the UGV is being used in an extremely time sensitive and/or dangerous matter, such as disabling a bomb). Drag torque could be applied by a motor while the tether is being controllably paid-out of the spool via the motor. However, this paying out motor based design is relatively expensive and consumes a relatively large amount of power. In UGV scenarios, one cannot afford to waste power, add a relatively large amount of weight to the vehicle, and/or use a relatively large amount of limited space on the vehicle base.

The present solution solves the above described drawbacks of conventional fishing spools. In this regard, the present solution comprises a spool mechanism with a motor for rewinding the tether, a coupler (e.g., a clutch) for selectively engaging/disengaging the rewind motor from the spooling system, and a drag mechanism. The drag mechanism is implemented as an adjustable friction device. The motor, coupler (e.g., clutch) and drag mechanism are used to perform automatic tether tension/drag setting as described below.

Figure 1:
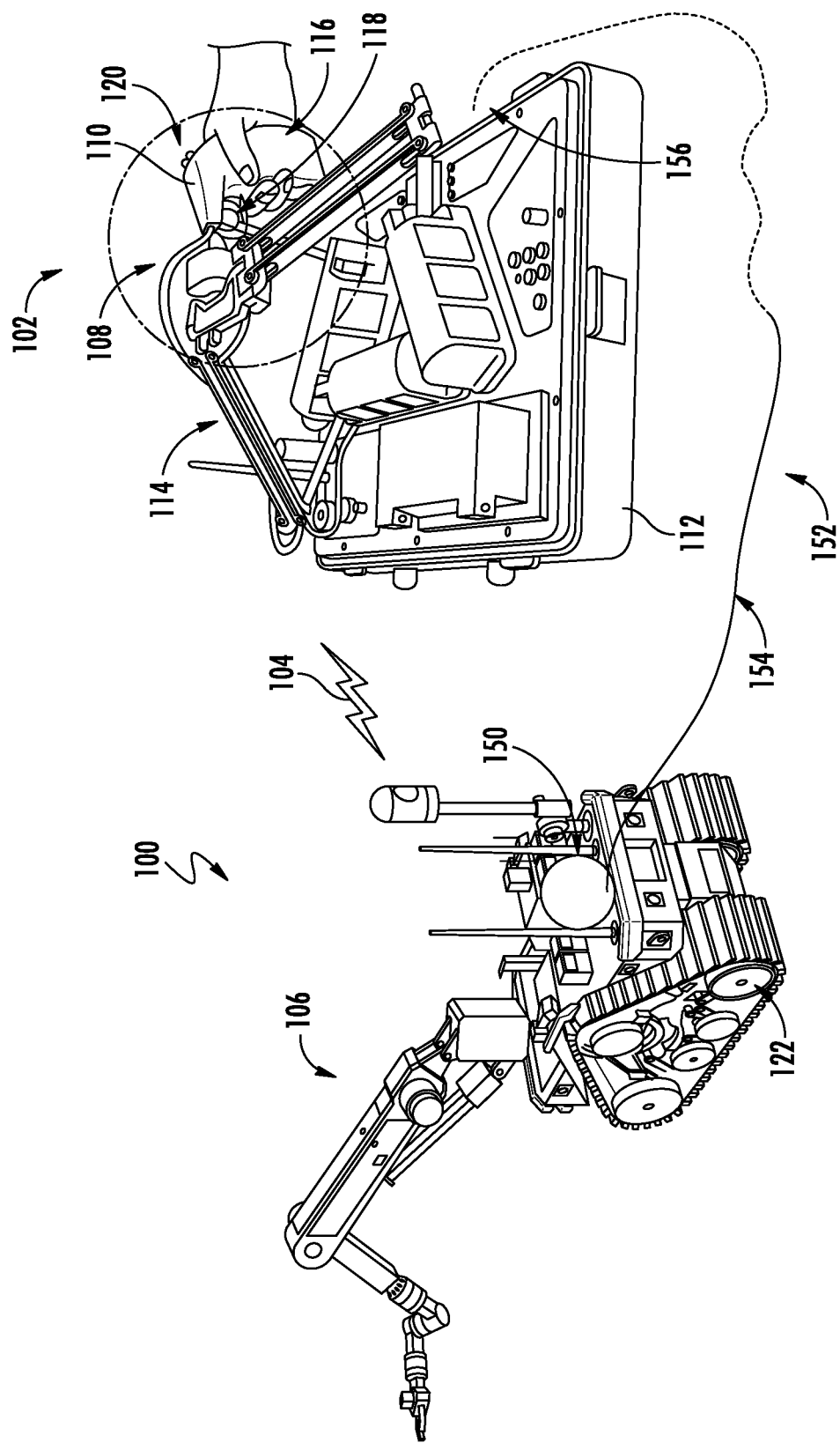
FIG. 1 is a perspective view of an UGV and a control unit.
Figure 2:
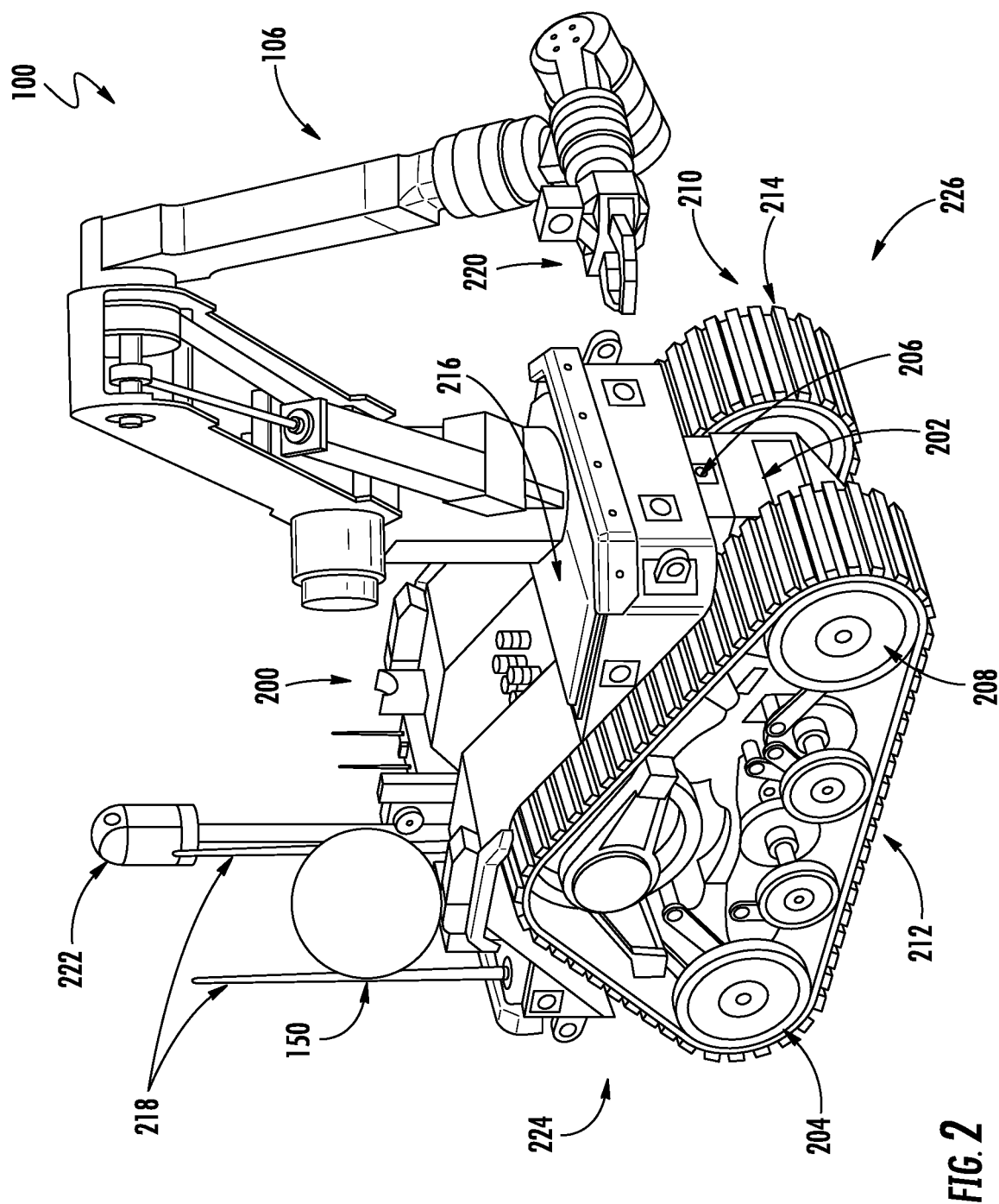
FIG. 2 is a perspective view of the vehicle shown in FIG. 1.
Figure 3:
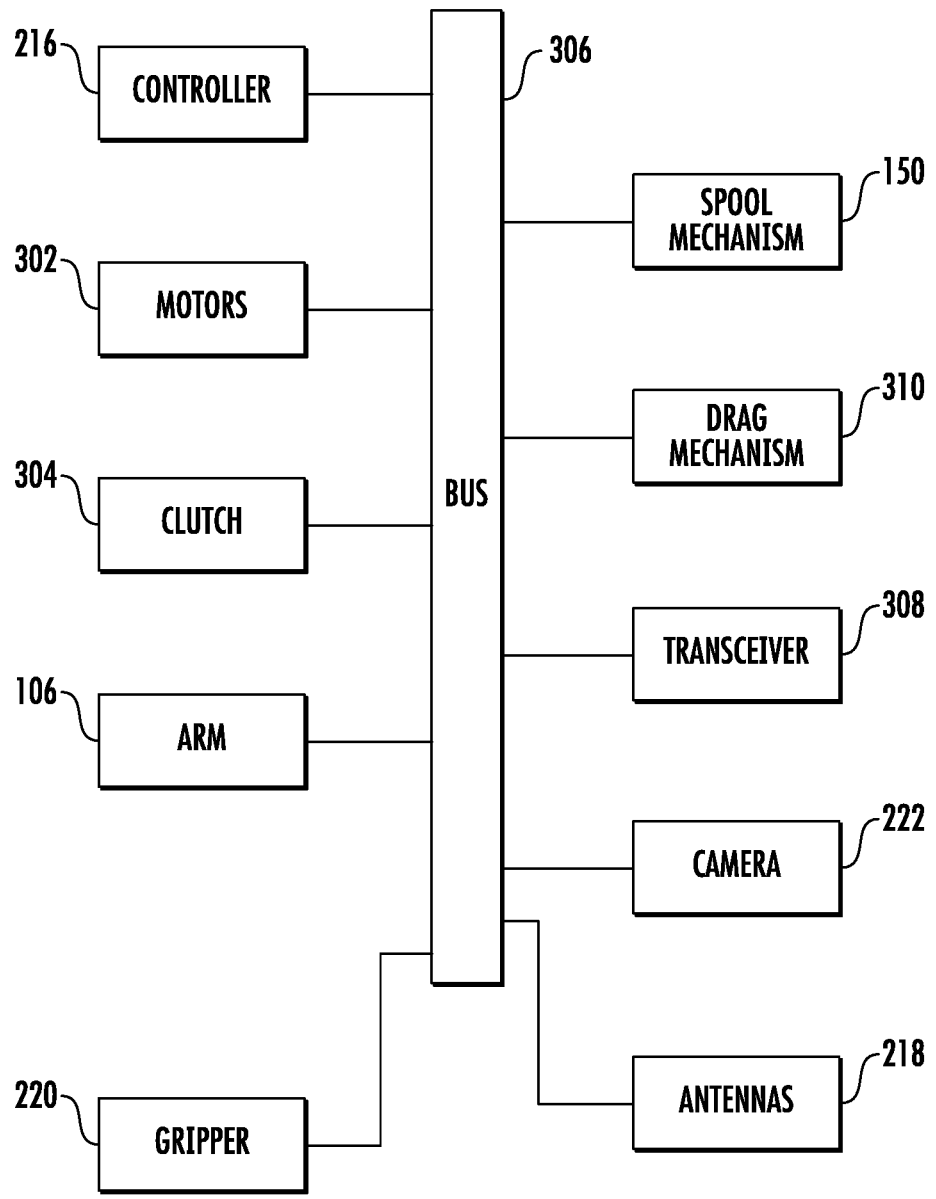
FIG. 3 is a schematic illustration of various electrical and electronic components of the vehicle shown in FIGS. 1-2.
Figure 4:
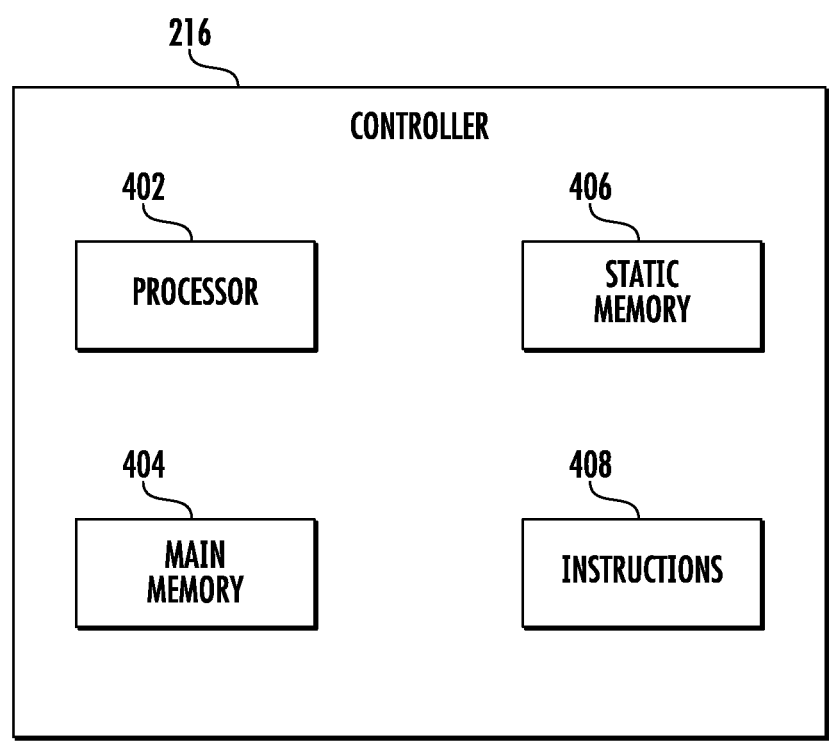
FIG. 4 is a schematic illustration of various electrical and electronic components of the controller shown in FIG. 3.
Figure 5:
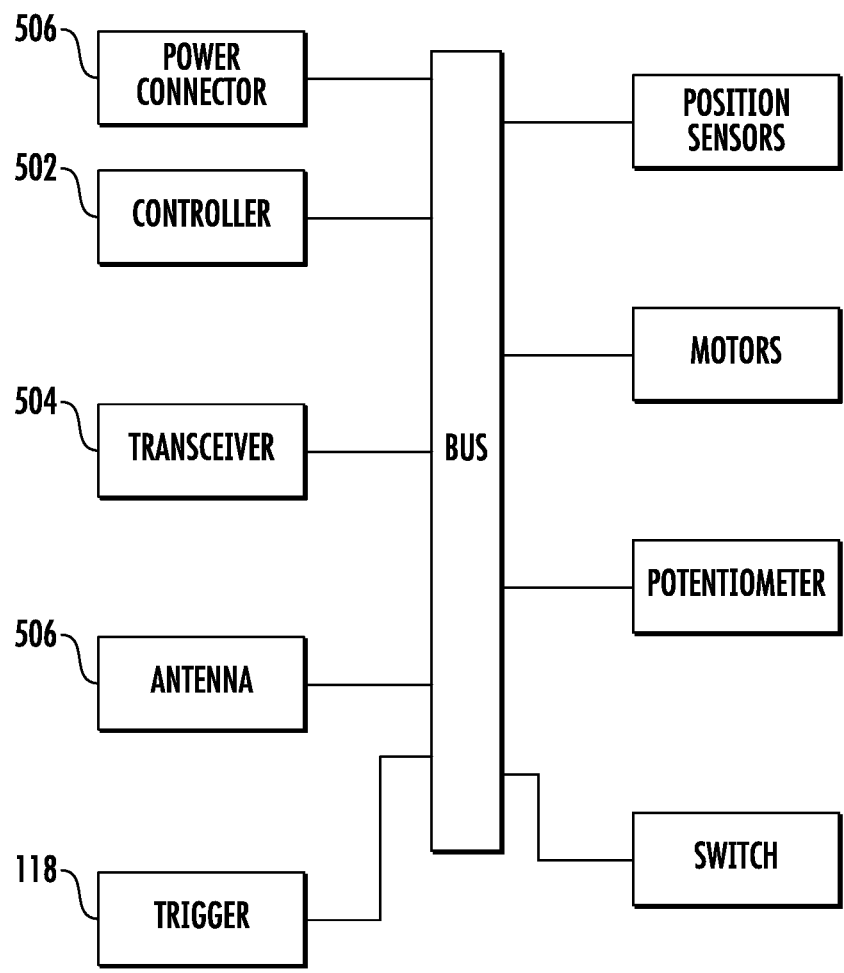
FIG. 5 is a schematic illustration of various electrical and electronic components of the control unit shown in FIG. 1.

Referring now to FIGS. 1-4, there are provided schematic illustrations of an illustrative UGV 100 and control unit 102. The schematic illustrations of the UGV 100 and control unit 102 shown in FIGS. 1-2 are not drawn to scale. For example, the UGV 100 can be significantly larger than the control unit 102. However, FIGS. 1-2 are sufficient for understanding the present solution, and relationship between the two electronic components 100 and 102.

The UGV 100 is a motorized vehicle that operates without an on-board human presence. The UGV 100 can be used in various applications, such as EOD applications, search and rescue applications, hazardous material disposal applications, and/or surveillance applications. The UGV 100 can be remotely controlled using the control unit 102. In this regard, the control unit 102 enables a user's control of the UGV's operations and movement from a remote location. The control unit 102 may be configured to communicate with the UGV 100 via a wireless communication link 104 (e.g., an RF link) and a tether communication link 152.

The tether communication link 152 is facilitated by a tether 154. A connector (not shown in FIG. 1) is provided at a distal end 156 of the tether 154. When in use, the connector mates with a plug (not shown in FIG. 1) of the control unit 102 so as to facilitate communications between the UGV 100 and control unit 102. Mating connectors and plugs are well known in the art, and therefore will not be described herein. Any known or to be known mating connector and plug can be used herein without limitation.

The UGV 100 comprises a spool mechanism 150 with a motor for rewinding the tether 154, a coupler 304 for selectively engaging/disengaging the rewind motor from the spooling system, and a drag mechanism 310. The coupler 304 can include, but is not limited to, a clutch. The coupler 304 will be referred to herein as a clutch. However, the present solution is not limited in this regard. The drag mechanism is implemented as an adjustable friction device. The motor, clutch and drag mechanism are used to perform automatic tether tension/drag setting as discussed below. The electronics of the UGV 100 can be electrically connected to the electronics of the spool mechanism 150. This electrical connection allows a user to remotely control the spool mechanism 150 and/or allows the use of already existing hardware/software of the UGV 100 for controlling/operating the spool mechanism 150.

The UGV 100 includes a body 200 comprising a rigid chassis 202. The UGV 100 also includes movable elements in the form of two rear wheels 204, 122 and two front wheels 208, 210. The rear wheels 204, 122 are mounted proximate a rear-end 224 of the rigid chassis 202 on opposite sides thereof. The front wheels 208, 210 are mounted proximate the frontend 226 of the rigid chassis 202 on opposite sides thereof. In alternative scenarios, the movable elements can be structures other than wheels, such as articulating legs.

The UGV 100 further comprises actuating devices in the form of two variable-speed, reversible electric motors 302. The motors 302 are mounted on the body 200. A first motor is coupled to the front wheel 208 so that activation of the first motor causes the front wheel 208 to rotate. A second motor is coupled to the front wheel 210 so that activation of the second motor causes the front wheel 210 to rotate. Additional motors (not shown) can be employed for directly driving the rear wheels 204, 122.

The rear wheel 204 and the front wheel 208 are located on the same side of the UGV 100. The rear wheel 204 and the front wheel 208 are coupled by way of a tread or track 212. Rotation of the front wheel 208 drives the track 212, which in turn causes the rear wheel 204 to rotate. Similarly, the rear wheel 122 and the front wheel 210 are located on the same side of the UGV 100. The rear wheel 122 and the front wheel 210 are coupled by way of a tread or track 214. Rotation of the front wheel 210 drives the track 214, which in turn causes the rear wheel 122 to rotate.

The UGV 100 further includes a controller 216. The controller 216 comprises a processor 402 (e.g., a Central Processing Unit ("CPU")), a main memory 404 and a static memory 406. These electronic components 402-406 communicate with each other via a bus 306. The static memory 406 stores one or more sets of instructions 408 (e.g., software code). The instructions 408 implement one or more of the methodologies, procedures, or functions described herein. The instructions 408 can also reside, completely or at least partially, within the main memory 404 or the processor 402 during execution thereof thereby. The main memory 404 and the processor 402 also can constitute machine-readable media.

The UGV 100 includes a transceiver 308 communicatively coupled to the processor 402 via the bus 306. The transceiver 308 communicates with the control unit 102 via a wireless communication link 104 (e.g., a Radio Frequency ("RF") transmission). One or more antennas 218 (is)are provided to facilitate the transmission and reception of information to and from the transceiver 308 of the UGV 100.

An articulating arm 106 is mounted on the body 200 of the UGV 100. The articulating arm 106 is equipped with at least one gripper 220, which is mounted on the freestanding end thereof. One or more cameras 206, 222 is(are) also mounted on the body 200 of the UGV 100. The articulating arm 106, gripper 220 and camera(s) 206, 222 can be remotely controlled via the control unit 102.

The position of the UGV 100 is controlled through the selective activation and deactivation of the motors 302 in response to control inputs generated by the control unit 102. Linear or straight-line travel of the UGV 100 is effectuated by the simultaneous activation of motors 302 in the same direction and at the same speed so as to drive tracks 212, 214 in the same direction and at the same speed. Turning of the UGV 100 can be achieved by (1) simultaneously activating the motors 302 in opposite directions or in the same direction at different speeds or (2) operating only one of the motors 302.

The control unit 102 comprises a controller 502. The controller 502 is similar to or the same as the controller 216 of the UGV. As such, the controller 502 may include a processor (not shown) and memory (not shown) housed in a rigid casing (not shown). Instructions (not shown) may be stored in the memory. The instructions can be implemented as software code configured to implement one or more of the methodologies, procedures, or functions described herein. The processor and memory can constitute machine-readable media.

The control unit 102 also includes a wireless transceiver 504 and a power connector 506 communicatively coupled to the controller 502. The transceiver 504 is configured to communicate with the transceiver 308 of the UGV 100 via an RF communication link 104. An antenna 506 is provided to facilitate the transmission and reception of RF signals to and from the control unit 102. The power connector 506 is configured to mate with a connector disposed at a distal end of the tether 154 of the UGV 100 so as to facilitate the tether communication link 152.

The control unit 102 further comprises an input device 108 for providing user inputs to the controller 502. In some scenarios, the input device 108 comprises a joystick to command the vehicle's movement. In other scenarios, the input device 108 comprises a hand grip 110 movably coupled to a base 112 via a plurality of linkages 114. The hand grip 110 includes a body 116 and a trigger 118. The body 116 is sized and shaped to be grasped by the hand of an operator. The trigger 118 is movable between a rest position and a fully depressed position. In this regard, the trigger 118 is mounted on the body 116 so that the user can pull or depress the trigger using his or her index finger while grasping the hand grip 110. Buttons 120 are disposed on the hand grip 110 for providing a means to control the grippers 220, camera 222 and other operational features of the manipulator arm 106.

As noted above, the UGV 100 and control unit 102 can be communicatively coupled to each other via the tether communication link 152. The tether communication link 152 is facilitated by tether 154. The tether 154 is retractable. In this regard, the UGV 100 comprises a spool mechanism 150 with a motor for rewinding the tether 154. The motor is engaged and disengaged via the clutch 304. A drag mechanism 310 is provided as an adjustable friction device. The particulars of the spool mechanism 150 will now be discussed in relation to FIGS. 6-13.

As shown in FIGS. 6-10, the spool mechanism 150 comprises a spool section 612 for receiving a length of a tether 154 and a base section 618 for attachment to the UGV's body 200. Notably, the spool mechanism 150 can alternatively be attached to another object remote from the UGV 100 (e.g., the control unit 102 of FIG. 1). However, in some scenarios, it is desirable to have the spool mechanism 150 coupled directly to the UGV 100 for purposes of minimizing the risk of the tether snagging on an obstacle when paying out. The spool mechanism 150 can be coupled to the robot or vehicle at any location selected in accordance with a particular application. For example, the spool mechanism is coupled to a rear portion of the robot or vehicle so that the tether pays out as the robot or vehicle moves in a forward direction.

The tether 154 is formed of any known or to be known tether communication media. For example, the tether 154 includes, but is not limited to, a fiber optic cable or an electrical cable. The tether 154 has a length selected in accordance with a particular application. For example, the tether 154 has a length between 100-500 meters. The present solution is not limited to the particulars of these examples.

A tether boom 608 is attached to the spool section 612 via mechanical couplers (e.g., screws), an adhesive and/or weld. The tether boom 608 ensures that the tether 154 does not interfere with the UGV's movement or become tangled with the UGV 100 (or other object) while being paid-out and/or rewound. The tether boom 608 is formed of a rigid material (e.g., metal) or semi-rigid material (e.g., plastic). The tether boom 608 comprises a hollow tube through which the tether 154 passes. The interior surface of the hollow tube is generally smooth so as to not frictionally engage the tether when being pulled therethrough. A tether stop 604 is coupled to the tether 154 at its distal end 156. The tether stop 604 ensures that the entire tether 154 does not rewind, or (stated differently) that the connector 602 does not become damaged during the tether's rewinding. In this regard, the tether stop 604 has an overall size that is larger than the aperture formed through the tether boom 608. The tether stop 604 can be formed of any suitable material, such as a plastic material and/or a rubber material. In some scenarios, the tether stop 604 and/or tether boom 608 comprises electronic elements (e.g., sensors and communications components) to detect and provide notification of when they come in contact with one another during a tether rewinding process.

The male connector 602 mates with a female plug of the control unit 102 so as to facilitate a tether communication link between the UGV 100 and the control unit 102. Electrical connector assemblies are well known in the art, and therefore will not be described in detail herein. Any known or to be known electrical connector assembly can be used herein without limitation. The base section 618 may also comprise an electrical connector 702 for enabling the electrical connection between the electronics of the UGV and the electronics of the spool mechanism.

A level wind mechanism 616 is also attached to the spool section 612 via mechanical couplers (e.g., threaded nuts), an adhesive and/or weld. The level wind mechanism 616 is generally configured for facilitating the guided criss-cross laying of the tether 154 on the spool section 612 which is rotated by a motor 610 during a tether rewind process. A clutch 1014, gears 1016 and pulleys 1018 are also provided to facilitate the rewinding of the tether. In this regard, the level wind mechanism 616 is able to slide in two opposing directions along shafts 640 as the spool rotates. The direction of travel of the level wind mechanism 616 is reversed each time the level wind mechanism arrives at an end of the shafts 640. Level wind mechanisms are well known in the art, and therefore will not be described here in detail. Any known or to be known level wind mechanism can be used herein without limitation.

The spool section 612 comprises a generally cylindrical spool body 902 for receiving a length of tether 154 used for communication between two communication devices (e.g., the UGV 100 of FIG. 1 and the control unit 102 of FIG. 1). The tether 154 is wound around the spool body 902, and retained on the spool body 902 via two retaining plates 626. The spool body and retaining plates are formed of a rigid material (e.g., metal) or a semi-rigid material (e.g., plastic). The retaining plates may be coupled to the spool body via an adhesive and/or weld. Alternatively, the retaining plates are integrally formed with the spool body (e.g., during a molding process).

The spool body 902 has an aperture 904 formed therethrough. The aperture 904 extends along a central axis 912 of the spool body 902. The aperture 904 is sized and shaped to receive a longitudinal shaft 624. The spool section 612 is rotatably coupled to a first side 906 of the base section 618 via the longitudinal shaft 624, coupling plate 628 and couplers 630 (e.g., threaded fasteners (e.g., screws, bolts, and/or nuts). The spool section 612 is rotatably coupled to a second side 908 of the base section 618 via a protrusion 910. Notably, the spool section 612 is coupled to the base section 618 such that its lateral movement relative to the base section 618 is restricted or limited. The present solution is not limited to the manner in which the spool section 612 is rotatably coupled to the base section 618 and/or the manner in which the spool section's lateral movement is restricted. There are many techniques known in the art for rotatably coupling a spool to a base and/or for limiting a spool's lateral movement. Any known or to be known technique for rotatably coupling a spool to a base and/or for limiting a spool's lateral movement can be used herein without limitation.

One of the retaining plates 626 has a plurality of holes 642 formed along its circumferential peripheral edge. The holes 642 are sized and shaped to receive at least a portion of a locking pin 614. The locking pin 164 and holes 642 provide a means to prevent rotation of the spool body 902. For example, it may be desirable to prevent rotation of the spool body 902 when the UGV 100 is being stored.

The base section 618 comprises a spool support structure 632 and an electronics enclosure 634. The spool support structure 632 comprises two upward standing sidewalls 636, 638. The sidewalls 636, 638 extend perpendicular to the central axis 912 of the spool section 612, and are provided to support the spool section 612 during use (i.e., as the tether pays out from the spool and as the tether is rewound onto the spool).

A first sidewall 636 is designed to also support a brake assembly 606. The brake assembly 606 provides a means to maintain and control the tension of the tether 154 as the UGV 100 moves away from the control unit 102 whereby the tether pays out from the spool. Notably, the tension (or drag force) is held at an optimized value while the tether pays out. This is facilitated through the use of a drag mechanism 1012. In some scenarios, the drag mechanism comprises a brake pad. Accordingly, the drag mechanism 1012 is referred to herein as a brake pad. The present solution is not limited in this regard. Other known or to be known drag mechanisms can be used herein. When the brake pad 1012 touches the spool body 902, friction between the two elements is created. The friction limits the speed at which the spool rotates, and prevents the spool from rotating when the tether tension (or drag force) reaches a certain threshold value.

The optimized value is automatically or manually set via a drag adjustment mechanism 1002. The drag adjustment mechanism 1002 includes, but is not limited to, an adjustment fastener 1004, resilient members 1006, a support bar 1008, and a pivot point 1010. Each of the listed components 1004 and 1006 are well known in the art, and therefore will not be described in detail herein. Still, it should be noted that the adjustment fastener 1004 is threaded so that it threadingly engages the sidewall 636. The adjustment fastener 1004 can include, but is not limited to, a screw, a bolt, a threaded post, and/or a threaded nut. The resilient members 1006 include compression springs.

The support bar 1008 is formed of a rigid material, such as metal. An aperture 1026 is formed in the support bar 1008 that is sized and shaped to receive at least a portion of the adjustment fastener 1004. A first resilient member 1006 is disposed along an elongated body of the adjustment fastener 1004, and compressed between the adjustment fastener's head and the support bar 1008. A second resilient member 1006 is disposed along an elongated body of the adjustment fastener 1004, and compressed between support bar 1008 and the sidewall 636. The resilient members and support bar provide a spring loaded support arm. A first end 1028 of the support bar 1008 is designed so that the support bar is rotatably coupled to the sidewall 636, whereby the support bar is able to move in opposing directions 1022 and 1024. A second end 1030 of the support bar 1008 is designed so that the support bar can be securely coupled to the brake pad 1012. The brake pad 1012 is stationary relative to the support bar, i.e., it is not able to rotated relative to the support bar.

In the automated scenarios, the adjustment fastener 1004 is controllably mechanically rotated about its central axis 1020 to set the optimized drag force value. The mechanical rotation of the adjustment fastener can be achieved using a motor, gears, and/or linkages. In the manual scenarios, the adjustment fastener 1004 is manually rotated about central axis 1020 to set the optimized drag force value. The manual rotation of the adjustment fastener can be achieved via a screw driver, wrench or other tool.

The rotation of the adjustment fastener 1004 in a clockwise direction causes the support bar 1008 to rotate about pivot point 1010 in a direction 1022 towards the spool body 902. The rotation of the adjustment fastener 1004 in a counter clockwise direction causes the support bar 1008 to rotate about pivot point 1010 in a direction 1024 away from the spool body 902. In effect, the amount of frictional engagement the brake pad 1012 has with the spool body 902 is selectively controlled. The frictional engagement provides the tether tension (or drag force) set to the optimal value. The brake pad 1012 is formed of any suitable material, such as metal or ceramic.

The spool support structure 632 is disposed on the electronics enclosure 634. The electronics enclosure 634 is generally configured to house the electronics of the spool mechanism 150. The electronics can include, but are not limited to, signal converters for converting an optical signal into an electrical signal (and vice versa), signal amplifiers, a controller (e.g., a processor or CPU) for controlling operations of the spool mechanism 150, a memory, and Input/Output ("I/O") devices 644 (e.g., buttons, Light Emitting Diodes ("LEDs"), and/or connector ports). These electronic components communicate with each other via a bus. Instructions are executed by the controller. The instructions implement one or more of the methodologies, procedures, or functions described herein. The instructions can also reside, completely or at least partially, within the main memory or the controller during execution thereof thereby. The memory and the controller also can constitute machine-readable media. Each of the listed electronic elements is well known in the art, and therefore will not be described in detail herein. Any known or to be known electronic element can be used herein without limitation.

The operation of the spool mechanism 150 will now be described in relation to conceptual drawings shown in FIGS. 11-13. The spool mechanism 150 has three modes of operation: a Setting Drag ("SD") mode; a Paying Out Tether ("POT") mode; and a Rewinding Tether ("RT") mode. The SD mode will be described below in relation to FIG. 11. The POT mode will be described below in relation to FIG. 12. The RT mode will be described below in relation to FIG. 13.

The I/O devices 644 of the electronics enclosure 634 include means to select and change the operational mode of the spool mechanism 150. This means can include, but is not limited to, at least one push button, at least one switch, at least one knob, a keypad, and/or a touch screen (configured to detect human gestures including tap gestures).

Referring now to FIG. 11, a novel technique for setting an optimal drag torque 1104 of a spool mechanism is illustrated. The illustration of FIG. 11 includes the following components: motor 610; a gearhead 1114; clutch 1014; spool body 902 with a retaining plate 626; and level wind mechanism 616. The gearhead 1114 can include, but is not limited to, a mechanical device used to increase the motor torque.

In order to set the optimal drag torque 1104, the tether 154 is paid-out a certain amount through the application of a pulling force thereto. For example, 20 feet of tether 154 is paid-out. Next, the operational mode of the spool mechanism 150 is changed to the SD mode. The operational mode can be manually changed via the depression of a push button 644. The operational mode can be automatically changed when a detection is made that a certain amount of the tether 154 has been paid-out. In response to the mode change, the clutch 1014 is engaged. Notably, the clutch 1014 allows for the selective coupling and decoupling of the motor/gearhead to/from the rest of the system.

The rewind motor 610 is then activated for causing the tether 154 to be rewound on the spool. In this regard, the rewind motor 610 applies a motor torque 1102 to the gearhead 1016. This activation is achieved using a controller disposed in the electronics enclosure 634. The motor torque 1102 has a pre-defined value. The pre-defined value can be stored in a memory of the electronics disposed in the electronics enclosure 634, and used by the controller to control operations of the rewind motor 610. In some scenarios, the motor torque 1102 is proportional to a desired drag torque generated in the spool mechanism as a result of contact between the brake pad 1012 and the spool's retaining plate 626.

If a drag setting (or friction) is too high, the shaft 624 does not rotate despite the motor's activation. In this case, the amount of friction between the brake pad 1012 and retaining plate 626 is adjusted via the drag adjustment mechanism 1002. As noted above, this adjustment can be a manual adjustment or an automatic adjustment. In both cases, an adjustment fastener 1004 is rotated in a counter clockwise direction to move the brake pad 1012 in a direction away from the retaining plate 626, whereby the compression force applied by the brake pad to the retaining plate is decreased. As a result of the reduced compression force, the friction between the brake pad and the retaining plate is decreased.

If the drag setting (or friction) is too low, the shaft 624 rotates in response to the motor torque at a relatively fast speed. This causes the spool body 902 to rotate in direction 1110 at the relatively fast speed. As the spool body 902 rotates, the gears/belts/pulleys 1016-1018 cause the level wind mechanism 616 to move along shaft 640 in directions 1106, 1108 in an alternating manner (e.g., left, right, left, right, etc.). Notably, the gears/belts/pulleys 1016-1018 are disposed in a sidewall 638 of the spool support structure 632. In this regard, the sidewall 638 is designed with a housing having a cavity in which the gears/belts/pulleys 1016-1018 are disposed, as shown in FIG. 10. Also as the spool body 902 rotates, the retaining plate 626 rotates whereby too little friction is created between the retaining plate 626 and the stationary brake pad 1012.

Accordingly, the pressure applied to the retaining plate 626 by the brake pad 1012 is adjusted manually or automatically for setting the drag torque to its optimal value at the present moment (i.e., the current time of day, humidity, temperature, level of dust in the air, etc.). In this regard, the amount of friction between the brake pad 1012 and retaining plate 626 is adjusted via the drag adjustment mechanism 1002. As noted above, this adjustment can be a manual adjustment or an automatic adjustment. In both cases, an adjustment fastener 1004 is rotated in a clockwise direction to gradually move the brake pad 1012 in a direction towards the retaining plate 626, whereby the compression force applied by the brake pad to the retaining plate is gradually increased. As a result of the increased compression force, the friction between the brake pad and the retaining plate is increased. The friction is increased until the spool body 902 just begins to stop rotating (i.e., when the friction is set so as to exactly or substantially cancel out the specifically chosen motor torque 1102) and/or until the drag resistance is equal and opposite to the motor torque applied to the spool by the rewind motor. In some scenarios, the speed of the spool is reduced to a point where it is within a threshold percentage of a zero resistance speed. The threshold hold percent may be, for example, equal to or fall within the range of 1-40% of the zero resistance speed. As a result, the drag friction is adjusted to an ideal amount, accounting for current environmental conditions (e.g., temperature, humidity, etc.).

In the automated scenarios, a drag motor is provided to rotate a threaded element for gradually moving the brake pad 1012 in a direction towards the retaining plate 628. A sensor is also provided to monitor the speed of the spool as the friction between the brake pad 1012 and retaining plate 626 is increased. A processor is provided to determine when the spool's speed is within a threshold percentage of the zero resistance speed (e.g., via a comparison of a measured speed to at least one pre-stored reference speed). In response to such a detection, the supply of power to the rewind motor 610 is discontinued and the threaded element's rotation is discontinued. The drag motor, sensor and/or processor may be additional components added to the UGV and/or may comprise existing components of the UGV (e.g., the motor comprises one of the track drive motors). The present solution is not limited to the particulars of this automated scenario. Other configurations can be employed to facilitate the automation of the above-described SD mode process.

Referring now to FIG. 12, the POT mode of the spool mechanism 150 will be described. Notably, prior to entering the POT mode, the optimal drag torque was set as discussed above in relation to FIG. 11. The illustration of FIG. 12 includes the following components: motor 610; gearhead 1114; clutch 1014; spool body 902 with a retaining plate 626; and level wind mechanism 616.

In order to pay out the tether 154, the operational mode of the spool mechanism 150 is changed to the POT mode. The operational mode can be manually changed via the depression of a push button 644. If the mode changed from the SD mode, then the clutch 1014 is disengaged in response to the mode change from the SD mode to the POT mode. As noted above, the clutch 1014 allows for the selective coupling and decoupling of the motor/gearhead to/from the rest of the system. During the POT mode, power is not supplied to the motor 610. Accordingly, power is not consumed and components 610, 1014 do not move in the POT mode.

The distal end 156 of the tether is electrically connected to the control unit 102 via an electrical connector assembly 602. As the UGV 100 travels in a forward direction, the tether pays out in a direction 1204. The drag 1202 provides a constant resistance at an optimal level to prevent fouling of the spool when the UGV decelerates. As the tether pays out, the level wind mechanism 616 moves along shaft 640 in directions 1106, 1108 in an alternating manner (e.g., left, right, left, right, etc.).

Referring now to FIG. 13, the RT mode of the spool mechanism 150 will be described. The illustration of FIG. 13 includes the following components: motor 610; gearhead 1114; clutch 1014; spool body 902 with a retaining plate 626; and level wind mechanism 616.

In order to rewind the tether 154, the distal end 156 of the tether is electrically disconnected from the control unit 102. Next, the operational mode of the spool mechanism 150 is changed from the POT mode to the RT mode. The operational mode can be manually changed via the depression of a push button 644. In response to the operational mode change, the clutch 1014 is engaged. As noted above, the clutch 1014 allows for the selective coupling and decoupling of the motor/gearhead to/from the rest of the system.

Power is then supplied to the motor 610. In turn, the motor 610 applies a rewind torque 1302. The rewind torque 1302 is greater than the motor torque 1102 to overcome the friction between the brake pad 1012 and retaining plate 626. The motor torque 1302 causes the spool body 902 to rotate in direction 1302 whereby the tether 154 is wound onto the spool. As the tether rewinds, the level wind mechanism 616 moves along shaft 640 in directions 1106, 1108 in an alternating manner (e.g., left, right, left, right, etc.).

The tether is wound until (a) the motor 610 is turned off and/or (b) the tether stop 604 hits the tether boom 608. One or more sensors can be provided to detect when the tether stop 604 hits the tether boom 608. The present solution is not limited to the two described ways (a) and (b) of ending the rewind process. Other techniques can be used herein without limitation. For example, a smart device can be employed that determines when the motor torque increased above a threshold value or the motor stopped for the same amount of torque.

In view of the forgoing, the present solution provides systems and methods of setting drag of a spooling mechanism prior to a mission that guarantees precise, repeatable drag friction. This eliminates the risk of tether fouling and the risk of comprising a mission.

Referring now to FIG. 14, there is provided a flow diagram of an illustrative method for operating a spool mechanism (e.g., spool mechanism 150 of FIGS. 1-10). The method begins with 1402 and continues with 1404 where a certain amount of tether is paid-out from a spool (e.g., spool section 612 of FIGS. 6-10) of the spool mechanism. Notably, a clutch (e.g., clutch 1014 of FIG. 10) of the spool mechanism is disengaged when the tether is paying out.

Subsequently, an operational mode of the spool mechanism is transitioned in 1406 from a first operational mode of a plurality of different operational modes in which a drag torque is not settable to a second operational mode of the plurality of different operational modes in which the drag torque is settable. In some scenarios, the operational mode of the spool mechanism is changed via user interaction with an input device (e.g., input device 644 of FIG. 6) of the spool mechanism. In other scenarios, the operational mode of the spool mechanism is changed automatically via electronics disposed within an electronics enclosure (e.g., electronics enclosure 634 of FIG. 6) of the spool mechanism.

In response to the spool mechanism's transition into the second operational mode, the clutch is engaged in 1408 so as to selectively mechanically couple a rewind motor (e.g., motor 610 of FIGS. 6-10) to the spool. Next in 1410, the rewind motor is activated such that the rewind motor applies a motor torque having a pre-defined value selected for facilitating a setting of the drag torque to an optimal value. In some scenarios, the motor torque is proportional to a desired drag torque generated in the spool mechanism as a result of contact between the drag mechanism and one of the spool's retaining plates. The motor torque may act to rewind the tether onto the spool.

Thereafter in 1412, an amount of drag resistance applied to the spool by a drag mechanism (e.g., 1002) is mechanically gradually adjusted. In some scenarios, the drag mechanism comprises an adjustable spring loaded support arm (e.g., support bar 1008 and resilient members 1006 of FIG. 10) having a brake pad (e.g., brake pad 1012 of FIG. 10) coupled thereto for providing the drag resistance through sliding friction against a rotating element (e.g., retaining plate 626 of FIG. 6) of the spool mechanism. In some scenarios, the amount of drag resistance is adjusted by rotating the brake pad towards or away from the spool. The amount of drag resistance is manually adjusted using a tool.

When the spool's speed is within a threshold percentage range of a zero resistance speed [1414: YES], method 1440 continues with 1416. In 1416, the mechanical adjustment of the drag resistance is discontinued. The supply of power to the rewind motor is also discontinued in 1418. Although 1416 and 1418 are shown as being sequentially performed, the present solution is not limited in this regard. Alternatively, the operations of 1416 and 1418 are performed concurrent or simultaneously in response to the spool's speed being within the threshold percentage of the zero resistance speed. Subsequently, 1420 is performed where method 1400 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a spool mechanism, comprising:
    transitioning an operational mode of the spool mechanism from a first operational mode of a plurality of different operational modes in which a drag torque is not settable to a second operational mode of the plurality of different operational modes in which the drag torque is settable;
    selectively mechanically coupling a rewind motor to a spool of the spool mechanism by engaging a coupler in response to the spool mechanism's transition into the second operational mode;
    activating the rewind motor such that the rewind motor applies a motor torque having a pre-defined value selected for facilitating a setting of the drag torque to an optimal value;
    mechanically gradually adjusting an amount of drag resistance applied to the spool; and
    discontinuing the mechanical adjustment of the drag resistance when the spool's speed is within a threshold percentage range of a zero resistance speed.

2. The method according to claim 1, further comprising paying out a certain amount of tether from the spool prior to said transitioning.

3. The method according to claim 2, wherein the coupler is disengaged when the tether is paying out.

4. The method according to claim 1, wherein the operational mode of the spool mechanism is changed via user interaction with an input device of the spool mechanism.

5. The method according to claim 1, wherein the motor torque is proportional to a desired drag torque generated in the spool mechanism as a result of contact between a friction material the spool.

6. The method according to claim 1, wherein the motor torque acts to rewind the tether onto the spool.

7. The method according to claim 1, wherein the drag resistance is applied to the spool using a brake pad.

8. The method according to claim 1, further comprising discontinuing a supply of power to the rewind motor when the spool's speed is within the threshold percentage range of the zero resistance speed.

9. The method according to claim 1, wherein the amount of drag resistance is adjusted by moving a brake pad towards or away from the spool.

10. The method according to claim 1, wherein the amount of drag resistance is manually adjusted using a tool.

11. A spool mechanism, comprising:
    an input element configured to cause a transition of the spool mechanism's operational mode from a first operational mode of a plurality of different operational modes in which a drag torque is not settable to a second operational mode of the plurality of different operational modes in which the drag torque is settable;
    a spool having a length of a tether wound thereon;
    a coupler disposed between the spool and a rewind motor, where the coupler is (i) selectively disengaged when the spool mechanism is in the first operational mode so as to mechanically decouple the rewind motor from the spool and (ii) selectively engaged when the spool mechanism is in the second operational mode so as to mechanically couple the rewind motor to the spool;
    the rewind motor configured to apply a motor torque to the spool that has a pre-defined value selected for facilitating a setting of the drag torque to an optimal value when the spool mechanism is in the second operational mode; and
    a device configured to apply a drag resistance to the spool by a gradually adjustable amount, where an adjustment of the drag resistance is discontinued when the spool's speed is within a threshold percentage range of a zero resistance speed.

12. The spool mechanism according to claim 11, wherein a certain amount of tether is paid-out from the spool prior to when the spool mechanism's operational mode is transitioned into the second operational mode.

13. The spool mechanism according to claim 12, wherein the coupler is disengaged when the tether is paying out.

14. The spool mechanism according to claim 11, wherein the operational mode of the spool mechanism is changed via user interaction with an input device of the spool mechanism.

15. The spool mechanism according to claim 11, wherein the motor torque is proportional to a desired drag torque generated in the spool mechanism as a result of contact between a brake pad and the spool.

16. The spool mechanism according to claim 11, wherein the motor torque acts to rewind the tether onto the spool.

17. The spool mechanism according to claim 11, wherein the device comprises a brake pad.

18. The spool mechanism according to claim 11, wherein a supply of power to the rewind motor is discontinued when the spool's speed is within the threshold percentage range of the zero resistance speed.

19. The spool mechanism according to claim 11, wherein the amount of drag resistance is adjusted by moving a brake pad towards or away from the spool.

20. The spool mechanism according to claim 11, wherein the amount of drag resistance is manually adjusted using a tool.

\* \* \* \* \*